Patented May 20, 1930

1,759,111

UNITED STATES PATENT OFFICE

HEINRICH GREUNE, OF HOCHST-ON-THE-MAIN, GERMANY, ASSIGNOR TO GENERAL ANILINE WORKS, INC., OF NEW YORK, N. Y., A CORPORATION OF DELAWARE

CYCLIC KETONIC COMPOUNDS AND PROCESS OF PREPARING THEM

No Drawing. Application filed July 5, 1927, Serial No. 203,669, and in Germany July 8, 1926.

My present invention relates to new cyclic ketonic compounds and to a process of preparing the same; more particularly it relates to compounds containing the atom-grouping:

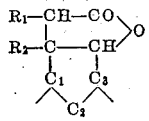

wherein $R_1$ and $R_2$ represent a substituent of the group including hydrogen and halogen, and $C_1$, $C_2$ and $C_3$ represent carbon atoms belonging to an aromatic nucleus.

My new compounds are obtainable for instance by causing a compound of the general formula:

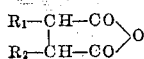

wherein $R_1$ and $R_2$ represent a substituent of the group including hydrogen and halogen, to react upon an aromatic hydrocarbon having an unsubstituted peri-position, at a temperature of about 10° C. to about ordinary temperature, in the presence of an acid condensing agent, as for instance aluminum chloride and a solvent such as nitrobenzene and fusing the intermediate product thus obtained together with aluminum chloride or sodium-aluminum chloride for a short time, as for instance for about 40 minutes.

This process probably takes place according to the following equation in which as an example acenaphthene has been chosen as the aromatic hydrocarbon:

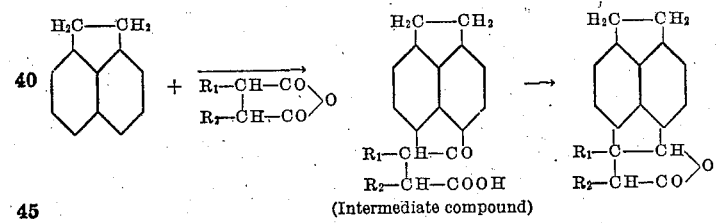

(Intermediate compound)

Instead of carrying out my process in two stages, as described above, I can effect the formation of my new cyclic ketonic compounds in one stage by changing the reaction conditions so as to effect a stronger condensing action. The aromatic hydrocarbon having an unsubstituted peri-position may for instance be melted together with a compound of the general formula:

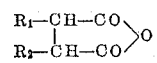

wherein $R_1$ and $R_2$ represent the same as above, in the presence of an acid condensing agent, such as aluminum chloride, to a temperature of for instance 120° to 140° C.

My new compounds are intended to be used as parent compounds for the manufacture of dyestuffs.

In U. S. Patent No. 1,702,002 dated February 12, 1929, I have disclosed that condensation products showing the properties of cyclic ketones are obtainable by causing maleic anhydride to react with an aromatic hydrocarbon having an unsubstituted peri-position. I wish it to be understood that the compounds obtainable according to the process described in the present application are different from those described in my said copending application. The latter, for instance, show an intense fluorescence, whereas the new compounds of my present application possess in, for instance, concentrated sulfuric acid only a slight fluorescence.

The following examples illustrate the invention, the parts being by weight:—

(1) Into 400 parts of molten sodium-aluminium chloride is introduced by portions, at a temperature of about 120° C. to 140° C., a powdered mixture of 30.8 parts of acenaphthene and 22 parts of succinic anhydride, and the melt is maintained at this temperature until the formation of the cyclic ketone is complete. After having decomposed the melt with much water the residue is filtered by suction and well washed first with hot dilute hydrochloric acid and then with hot water. In order to purify it, it is extracted with dilute sodium carbonate solution; thus the cyclic ketone is obtained; when recrystallized from alcohol it forms almost colorless needles melting at 180° C. and dissolving in concentrated sulfuric acid to a yellow solution having a slight greenish fluorescence.

(2) Into a solution of 185 parts of acenaphthene and 132 parts of succinic anhydride in 1800 parts of anhydrous nitrobenzene are introduced by degrees at ordinary temperature 360 parts of finely powdered aluminium chloride. After the mixture has been stirred at ordinary temperature for 24 hours, it is poured into ice water, the aqueous layer is separated, and the nitrobenzene solution is well shaken first with dilute hydrochloric acid and then with water, and the nitrobenzene is finally distilled by means of steam. The residue remaining after the distillation is dissolved in sodium carbonate solution and again precipitated by means of hydrochloric acid so as to obtain the product in a pure state. The product is a carboxylic acid crystallizing from dilute alcohol in the form of colorless laminæ melting at 206° C. It dissolves in concentrated sulfuric acid to an orange-yellow solution. By melting the acid for a short time at a raised temperature together with aluminium chloride or sodium-aluminium chloride and working up in the usual manner the melt so produced, there is obtained, after recrystallization from alcohol of the residue insoluble in sodium carbonate solution, the new cyclic ketone of melting point 180° C. described in Example 1.

(3) Into a solution of 128 parts of naphthalene and 110 parts of succinic anhydride in 1000 parts of anhydrous nitrobenzene are introduced by portions at a temperature below 10° C. 270 parts of aluminium chloride and the mixture is stirred at this temperature for 24 hours. After having decomposed the nitrobenzene solution with water and diluted hydrochloric acid, the nitrobenzene is distilled by means of steam, the residue remaining after the distillation is dissolved in sodium carbonate solution, the solution is filtered and from the filtrate the ketocarboxylic acid which has formed, is finally precipitated by means of dilute hydrochloric acid. By recrystallizing this acid from an organic solvent, as for instance alcohol, it can be isolated in the form of colorless needles melting at 432° C. By melting the acid thus purified for about 40 minutes at 150° C. to 160° C. together with four times its weight of aluminium chloride or sodium-aluminium chloride and working up in the usual manner, the molten mass so produced, a cyclic ketone is obtained which, when recrystallized from dilute alcohol, melts at about 165° C. This cyclic ketone may, of course, also be prepared in a single operation by melting the two components under suitable conditions with, for instance, sodium-aluminium chloride in a manner analogous to that indicated in Example 1.

Instead of naphthalene and acenaphthene there may be used another hydrocarbon having a free peri-position such as 1-methylnaphthalene or 1-chloronaphthalene or anthracene, and instead of succinic anhydride a dicarboxylic anhydride derived from maleic anhydride by the addition of a molecule of chlorine, bromine, or hydrochloric acid, hydrobromic acid or the like.

In the following claims the term "aromatic hydrocarbon having an unsubstituted peri-position" is understood to comprise also derivatives or substitution products thereof.

I claim:

1. As new products the compounds containing the atom-grouping:

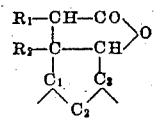

wherein $R_1$ and $R_2$ represent substituents of the group including hydrogen and halogen, and $C_1$, $C_2$ and $C_3$ represent carbon atoms belonging to an aromatic nucleus.

2. As new products the compounds of the probable general formula:

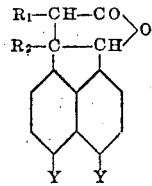

wherein $R_1$ and $R_2$ represent hydrogen or halogen and the two Y's represent hydrogen or stand jointly for the group:

3. As a new product the compound of the probable formula:

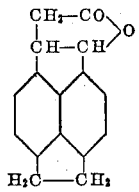

forming, when recrystallized from alcohol, almost colorless needles melting at 180° C. and dissolving in concentrated sulfuric acid to a yellow solution having a slight greenish fluorescence.

4. The process which comprises causing a compound of the general formula:

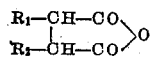

wherein $R_1$ and $R_2$ represent a substituent of the group including hydrogen and halogen, to act upon an aromatic hydrocarbon having an unsubstituted peri-position, in the presence of an acid condensing agent and a solvent at a temperature of about 10° C. to about ordinary temperature and heating the intermediate product thus obtained for a short time to a temperature of about 150° to 160° C. in the presence of aluminum chloride.

5. The process which comprises causing a compound of the general formula:

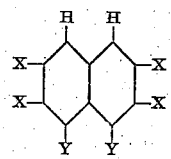

wherein X stands for hydrogen or a monovalent substituent and the two Y's stand for hydrogen or jointly for the group:

to react with a compound of the general formula:

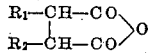

wherein $R_1$ and $R_2$ represent hydrogen or halogen, in the presence of aluminum chloride and nitrobenzene at a temperature of about 10° C. to about ordinary temperature and heating the intermediate product thus obtained for about 40 minutes to a temperature of about 150–160° C. in the presence of aluminum chloride.

6. The process which comprises introducing into a solution of about 185 parts of acenaphthene and about 132 parts of succinic anhydride in about 1800 parts of anhydrous nitrobenzene at room temperature about 360 parts of finely powdered aluminum chloride, stirring the mixture at ordinary temperature for about 24 hours and melting the reaction product for a short time at a raised temperature together with aluminum chloride.

7. The process which comprises causing a compound of the general formula:

R₁—CH—CO  
R₂—CH—CO  >O wherein $R_1$ and $R_2$ represent a substituent of the group including hydrogen and halogen, to act upon an aromatic hydrocarbon having an unsubstituted peri-position, in the presence of an acid condensing agent and a solvent at a temperature of about 10° C. to about ordinary temperature and melting the intermediate product thus obtained for a short time at a raised temperature together with aluminium chloride.

8. The process which comprises causing a compound of the general formula:

wherein X stands for hydrogen or a monovalent substituent and the two Y's stand for hydrogen or jointly for the group:

$\dot{C}H_2$—$\dot{C}H_2$ to react with a compound of the general formula:

R₁—CH—CO  
R₂—CH—CO  >O wherein $R_1$ and $R_2$ represent hydrogen or halogen, in the presence of aluminium chloride and nitrobenzene at a temperature of about 10° C. to about ordinary temperature and melting the intermediate product thus obtained at a raised temperature together with sodium-aluminium chloride.

In testimony whereof I affix my signature.

HEINRICH GREUNE.

CERTIFICATE OF CORRECTION.

Patent No. 1,759,111.　　　　　　　　　　　　Granted May 20, 1930, to

HEINRICH GREUNE.

It is hereby certified that error appears in the printed specification of the above numbered patent requiring correction as follows: Page 2, line 61, for "432° C" read "132° C"; and that the said Letters Patent should be read with this correction therein that the same may conform to the record of the case in the Patent Office.

Signed and sealed this 22nd day of July, A. D. 1930.

(Seal)

Wm. A. Kinnan,
Acting Commissioner of Patents.

Certificate of Correction

Patent No. 1,759,111. Granted May 20, 1930, to

HEINRICH GREUNE

It is hereby certified that error appears in the printed specification of the above numbered patent requiring correction as follows:

Page 1, between lines 37 and 47, strike out the formula for the intermediate compound and insert instead

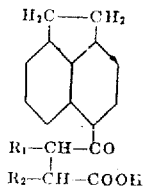

and that the said Letters Patent should be read with this correction therein that the same may conform to the record of the case in the Patent Office.

Signed and sealed this 18th day of November, A. D. 1930.

[SEAL.]

WM. A. KINNAN,
*Acting Commissioner of Patents.*